(No Model.)
D. D. TOAL & R. WILSON.
INSECT GUARD FOR BEDS.
No. 593,445. Patented Nov. 9, 1897.
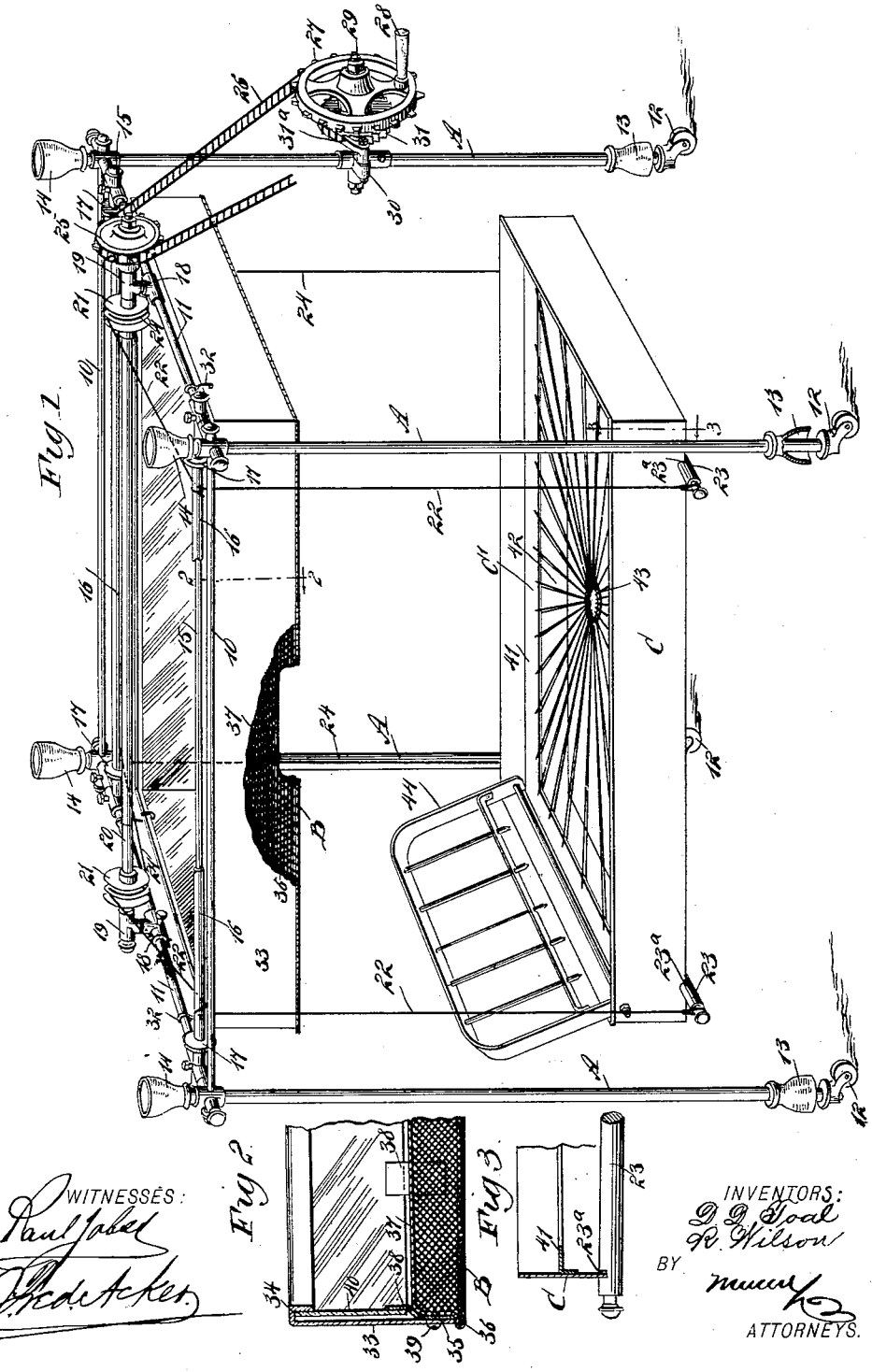
WITNESSES:
Paul Jabel
Fred Acker
INVENTORS:
D. D. Toal
R. Wilson
BY
ATTORNEYS.

UNITED STATES PATENT OFFICE.

DAVID D. TOAL AND RICHARD WILSON, OF NEW YORK, N. Y.

INSECT-GUARD FOR BEDS.

SPECIFICATION forming part of Letters Patent No. 593,445, dated November 9, 1897.

Application filed April 6, 1897. Serial No. 630,934. (No model.)

*To all whom it may concern:*

Be it known that we, DAVID D. TOAL and RICHARD WILSON, of New York city, in the county and State of New York, have invented a new and Improved Bed, of which the following is a full, clear, and exact description.

The object of the invention is to provide a bed which will be thoroughly protected against access of insects.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved bed and frame, a portion of the upper receptacle for insects being broken. Fig. 2 is a section taken substantially on the line 2 2 of Fig. 1, and Fig. 3 is a section taken practically on the line 3 3 of Fig. 1.

The frame consists of four uprights A, which are connected by side bars 10, located near the top, and cross-bars 11. Casters 12 are placed at the lower end of each upright, and inverted cups 13, preferably made of glass, are secured to the uprights at a point near the casters, as illustrated in Fig. 1, serving to prevent insects crawling from the floor up the uprights.

At the top of each upright a glass cup 14 or a cup of a similar nature is placed adapted to catch any insects if they drop downward to the frame in direction of said uprights, and at each side of the frame a fixed shaft 15 extends from one cross-bar to the other. Upon each of the fixed shafts within the frame a tubular shaft 16 is mounted to revolve, being provided with a disk or a head 17 at each of its ends. A fitting 18 is secured to the central portion of each cross-bar 11, and each fitting supports a box 19. In these boxes 19 a shaft 20 is mounted to turn, and the shaft near each end within the frame is provided with a pulley 21, having two peripheral grooves. A cord or a chain 22 is attached to one of the grooved surfaces of each pulley and is carried in direction of one side of the frame around the tubular shaft 16 at that side, and thence perpendicularly downward to an engagement with one end of supporting-bars 23, as shown in Fig. 1. To the other grooved surface of each pulley 21 a second rope or chain 24 is secured, winding thereon in a contrary direction to the ropes or chains 22. The ropes or chains 24 are carried in an opposite direction to the ropes or chains 22 and are wound around the opposite tubular shaft 16 and carried downward at the opposite sides of the frame to an engagement with the opposite ends of the supporting-bars 23. Each supporting-bar 23 is provided near each extremity in its upper surface with a recess $23^a$. The shaft 20, which is the drive-shaft, is driven through the medium of a chain 26, which is carried over a sprocket-wheel 25, secured to one end of the drive-shaft, the said chain being likewise carried over a driving-sprocket 27, provided with a handle 28 and secured upon a shaft 29, mounted to turn in a suitable hanger or bracket 30, secured to one of the uprights A. A ratchet-wheel 31 is secured to the driving-sprocket 27 or to a shaft carrying the same, the ratchet-wheel being adapted to be engaged by a pawl $31^a$, as illustrated in Fig. 1.

The cups 13 and 14 prevent insects from reaching the standards from the bottom or from the top, and in order that the bed which is to be carried by the supporting-bars 23 shall not be reached by insects falling from a point above the frame a frame 33, consisting of side and end pieces, is supported from the cross-bars 11 by means of suitable hangers 32. This frame is provided with a flange 34 at its upper edge, which is carried horizontally inward and thence vertically downward, as illustrated in Fig. 2.

The frame 33 is adapted to receive a detachable bottom B, which is made of reticulated or perforated material and comprises side and end portions strengthened at the bottom by a wire 36 or its equivalent, the sides and ends being designated as 35 and the top portion of the bottom being designated as 37. In fact, this bottom portion may be termed an "auxiliary reticulated frame" and is adapted to fit in the suspended or protective frame 33, being secured thereto, if necessary, by screws 39 or their equivalents.

The auxiliary frame B is provided with sundry brackets 38, which extend upward from its sides and its ends within the suspended or protective frame, being of angular construction, and the upper portions of the brackets 38 are preferably in vertical alinement with the perpendicular portions of the flange 34. Such an arrangement is provided in order that transparent panes 40, preferably of glass, may be introduced between the perpendicular portions of the flange 34 and the suspended frame and the upper ends of the brackets 38 and the suspended frame; but these transparent panes do not extend to the top of the reticulated or perforated frame B, a space intervening the two parts, as shown in Fig. 2. Consequently any insects that may drop from above over the bed-frame will fall upon the perforated portion of the suspended or protective frame and will crawl through the space between the transparent panes and the perforated bottom of the suspended frame to the space between the transparent panes and the main or body portion of the suspended or protective frame, where they will lodge and may be readily discovered and removed.

The bed C may be of any approved form, and the side pieces of the frame of the bed enter the recesses 23$^a$ in the supporting-bars 23, as shown in Fig. 1. The bed-frame is preferably provided with a mattress C′, which consists of a frame 41, suitably supported in or attached to the bed-frame, and cords, springs, or wires 42, attached to said frame 41 and carried to a central ring 43, as illustrated in Fig. 1. A swinging or pivoted head-piece 44 is likewise preferably provided for the bed.

Having thus described our invention, we claim as new and desire to secure by Letters Patent—

1. A canopy for a bed, upwardly concaved and having hollow vertically-disposed boundary-walls communicating with the interior by slots at the bottom of the inner walls thereof, substantially as described.

2. A canopy for a bed, upwardly concaved, having hollow vertically-disposed boundary-walls communicating with the interior by slots at the bottom of the inner walls thereof, and having a reticulated or imperforate bottom, substantially as described.

3. A canopy for a bed, upwardly concaved and having hollow vertically-disposed boundary-walls communicating with the interior by slots at the bottom of the inner walls thereof, one of said walls being transparent, substantially as described.

4. In a supporting-frame for beds or like articles, means for protecting the bed from the encroachments of insects, consisting of a second frame suspended from the main frame, comprising side and end pieces, a reticulated bottom for the suspended frame, and transparent panes supported between the upper portion of the suspended frame and its bottom, a space being provided between the transparent panes and the sides and the ends of the suspended frame, a space being likewise provided between the transparent panes and the reticulated bottom, as and for the purpose specified.

5. The combination, with the supporting-frame of a bed, of a frame suspended therefrom, adapted to protect a bed from the encroachments of insects from above, the said suspended frame consisting of side and end sections, each of which is provided with an inwardly and downwardly extending flange at the top, an auxiliary reticulated or perforated frame constituting the bottom of the suspended frame and provided with brackets extending upward therefrom substantially in alinement with the downwardly-extending portion of the flange of the suspended frame, and glass panes held by the flange of the suspended frame and the brackets of the perforated or reticulated frame, the glass panes being so supported as to form a space between them and the suspended frame and between their upper edges and the perforated or reticulated frame, as and for the purpose specified.

DAVID D. TOAL.
RICHARD WILSON.

Witnesses:
ADOLPHUS BEEBE,
HENRY JAEGER.